United States Patent
Hanks

(10) Patent No.: US 6,763,952 B2
(45) Date of Patent: Jul. 20, 2004

(54) COMPOSITE FLUID SEPARATOR

(76) Inventor: Gary David Hanks, 1249 Oliver, Bowling Green, KY (US) 42104

(*) Notice: Subject to any disclaimer, the term of this patent is extended or adjusted under 35 U.S.C. 154(b) by 0 days.

(21) Appl. No.: 10/076,161

(22) Filed: Feb. 14, 2002

(65) Prior Publication Data

US 2003/0150797 A1 Aug. 14, 2003

(51) Int. Cl.[7] .............................................. B01D 17/028
(52) U.S. Cl. ...................... 210/521; 210/532.1; 210/540
(58) Field of Search .............................. 210/521, 532.1, 210/538, 540, 522, DIG. 5

(56) References Cited

U.S. PATENT DOCUMENTS

| | | | |
|---|---|---|---|
| 1,661,284 A | * | 3/1928 | Fugua et al. ................. 210/313 |
| 3,331,510 A | * | 7/1967 | Arnold ........................ 210/521 |
| 3,754,656 A | * | 8/1973 | Horiguchi et al. ........... 210/521 |
| 3,849,311 A | * | 11/1974 | Jakubek ...................... 210/521 |
| 3,933,654 A | * | 1/1976 | Middelbeek ................ 210/521 |
| 4,064,054 A | | 12/1977 | Anderson et al. |
| 4,122,016 A | * | 10/1978 | Tao et al. .................... 210/540 |
| 4,203,849 A | | 5/1980 | Ino et al. |
| 4,299,699 A | * | 11/1981 | Boogay .................. 210/DIG. 5 |
| 4,400,274 A | | 8/1983 | Protos |
| 4,411,791 A | * | 10/1983 | Ward ...................... 210/DIG. 5 |
| 4,568,901 A | | 2/1986 | Adam |
| 4,747,948 A | | 5/1988 | North |
| 5,161,512 A | | 11/1992 | Adam et al. |
| 5,173,195 A | | 12/1992 | Wright et al. |
| 5,314,617 A | * | 5/1994 | Karterman .................. 210/521 |
| 5,397,472 A | * | 3/1995 | Bouchard ................... 210/521 |
| 5,520,825 A | | 5/1996 | Rice |
| 5,554,301 A | | 9/1996 | Rippetoe et al. |
| 5,685,974 A | | 11/1997 | Fleming |
| 5,698,102 A | | 12/1997 | Khudenko |
| 6,056,128 A | | 5/2000 | Glasgow |
| 6,217,777 B1 | | 4/2001 | Dahlquist et al. |
| 6,315,131 B1 | | 11/2001 | Terrien et al. |

* cited by examiner

Primary Examiner—Christopher Upton
(74) Attorney, Agent, or Firm—Laura M. Hagan; Kerrick, Grise, Stivers & Coyle, P.L.C.

(57) ABSTRACT

A composite fluid separator capable of isolating a first liquid from a composite fluid having a first and second liquid, in which the first and second liquids have differing specific gravities. An outer housing encloses a separation chamber. An inlet port delivers the composite fluid through an elongated spillway into the sump of the chamber. Positioned between the inlet port and the outlet port is a plurality of stacked baffles, composed of individual separation flow plates, placed in an inclined relationship. The plurality of baffles creates a flow path in which the composite fluid is forced to flow over each of the individual separation flow plates as it travels upward in the separation chamber toward the outlet port.

18 Claims, 5 Drawing Sheets

COMPOSITE FLUID SEPARATOR

BACKGROUND OF THE INVENTION

The present invention relates to a device used to separate composite fluids comprised of at least two liquids of differing specific gravities and to separate particulates from fluids.

SUMMARY OF THE INVENTION

The composite fluid separator is capable of isolating a first liquid from a composite fluid having a first and second liquid, in which the first and second liquid has differing specific gravities. The composite fluid separator can be used primarily in conjunction with large gasoline, diesel and hydraulic engines. Additionally, the present invention can be used for the separation of particulate from fluids in any setting.

An inlet port, which enters into an inner chamber of the separation device, delivers the composite fluid through an elongated spillway, which delivers the fluid into the sump area of the chamber. The composite fluid separator is comprised of an inlet port and an outlet port, with a flow path therebetween. The flow path extends around a plurality of baffles. The plurality of baffles form planes which are stacked in an inclined, nonparallel relationship. The plurality of baffles are arranged so that a first side of alternating baffles are flush with the first side wall of the chamber, while the second opposing side of the baffles is placed a predefined distance from the second side wall of the inner chamber. The remaining alternating baffles in the stacked plurality are placed so that the second sides of the baffles are flush with the second side wall of the chamber and the first sides of the baffles are a predefined distance from the first side wall of the chamber. Such alternating positioning of the baffles within the chamber forms a serpentine flow path over the baffles and through the separation chamber.

The inclined, nonparallel position of the baffles creates numerous narrow flow channels between the baffles. The arrangement of the plurality of the baffles forces the composite fluid to be directed in a serpentine fashion across each baffle as it moves through the numerous openings between the side walls of the chamber and the plurality of baffles toward the outlet port. As the composite fluid follows this flow path, it rises upwardly within the separation chamber. The serpentine pathway and the numerous baffles limit the upward mobility of the heavier liquid. The molecules of the heavier liquid come into contact with each other, coagulating into a larger mass, eventually dropping toward the bottom end of the inclined baffles along with the particulate into the sump area of the chamber.

The lower ends of the baffles extend toward, but not to, the front wall of the chamber. The spacing between the lower ends of the baffles and the front wall of the chamber is approximately one-half the size of the openings between the sides of the baffles and the chamber side walls.

Each of the baffles within the separation chamber is actually comprised of a series of subplates placed one on top of the other, which form a triangular stair step like structure. These subplates serve a directional purpose in that they direct the fluid upward towards the next baffle and also provide an irregular surface area which enlarges the contact surface area between the composite fluid and the baffles. The shearing of the composite fluid by the subplates assists with the removal of particulates and separation of fluids having differing specific gravities.

As the composite fluid travels through the separation chamber, it is sheared so that it efficiently and effectively isolates the liquids that form the composite fluid. After traveling through the flow path, the liquid with the lighter specific gravity reaches the outlet port of the chamber. The outlet port may also allow for use of other types of coalescing devices or filtering devices to be placed within the outlet port to further enhance the separation capabilities of the chamber.

Thus, one object of the present invention is to provide a separation chamber for composite fluids.

An additional object of the present invention is to provide a composite fluid separator which isolates a first fluid from a second fluid.

An even further object of the present invention is to provide a separation chamber for a composite fluid separator wherein the separation chamber has a plurality of baffles contained therein, the composite fluid passing over the plurality of baffles within the separation chamber.

Another object of the present invention is to have a separation chamber formed of a plurality of baffles wherein the baffles form a serpentine flow path for the composite fluid. The flow path may be increased by providing that each of the baffles is actually comprised of a plurality of baffles stacked upon each other in stair step fashion in order to force the composite fluid in an upward direction.

An additional object of the present invention is to provide a separation chamber wherein the flow path of the composite fluid is such that the fluid is quickly separated into distinct fluids based upon the specific gravity of the fluids, the baffles enabling the heavier fluids to be separated out and deposited into a sump area of the separation chamber.

Finally, another object of the present invention is to provide a composite fluid separation device wherein particulate material within the composite fluid may also be separated from the fluid.

All of the above-outlined objectives are to be understood as exemplary only and many more objectives of the invention may be gleaned from the disclosure herein. Therefore, no limiting interpretation of the objectives noted is to be understood without further reading of the entire specification, claims and drawings included herewith.

DETAILED DESCRIPTION OF THE EMBODIMENT

Figure 1:
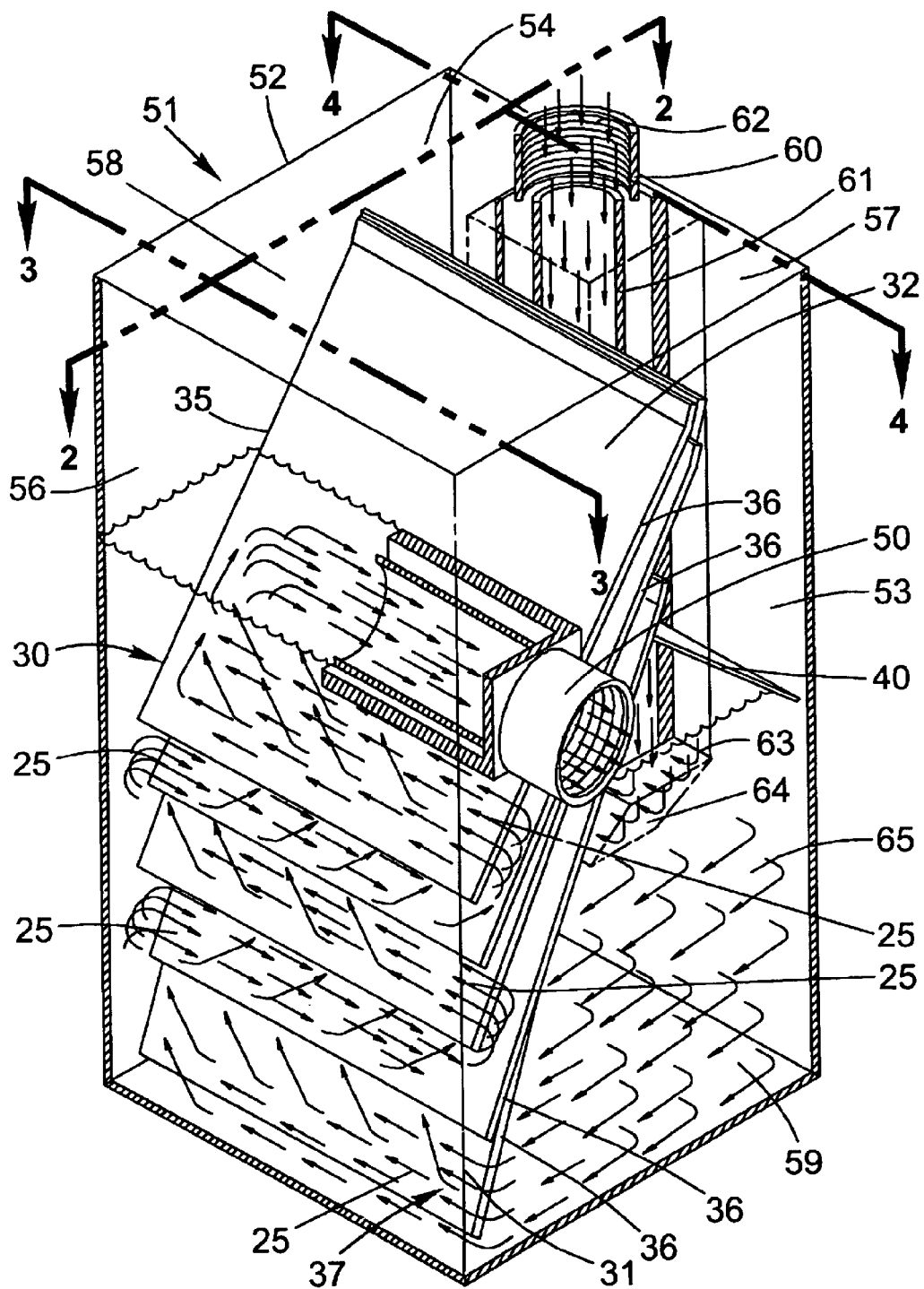
FIG. 1 is a perspective partial cut-away of an embodiment of the present invention, illustrating the flow path of the composite fluid.

FIG. 1 is a cut-away perspective view of the composite fluid separator 51 used to separate a composite fluid having two fluids with differing specific gravities and also used to remove particulate from fluids. An outer housing 52 encloses an inner separation chamber 53. Although the shape of the diameter of the separation chamber 53 may vary, one embodiment is square. However, many varying geometry may be utilized in order to accomplish the separation of composite fluid using the principals of the present invention and no limiting interpretation should be read into the exemplary specific devices described herein.

The separation chamber 53 has a top and bottom surface 54, 55, a front and rear wall 56, 57, and a first and second side wall 58, 59. The periphery of the separation chamber 53 is surrounded by walls. An inlet port 60 penetrates the top surface 54 of the chamber 53 and extends to form an elongated spillway 61 that is attached to the rear wall of the chamber 53. The inlet port 60 has a first and second end 62, 63. The first end 62 of the inlet port 60 is near the top surface 54 of the inner chamber 53 and is open. The inlet port 60 and the spillway 61 can be integrated into a singular spillway component or the inlet port 60 and the spillway 61 can be separate elements which possibly telescope together.

The second end 63 of the spillway 61 extends down toward the bottom wall or surface 55 of the separation chamber 53 along rear wall 57. The lower or second end 63 of the spillway 61 is open, but does have an end baffle 64 attached at an angle in order to dispense the material at an angular path.

As the composite fluid flows out of the lower end 63 of the spillway 61 into the sump portion 65 of the chamber 53, the end baffle 64 serves to provide a shearing mechanism for the composite fluid as it is deposited through the spillway into the chamber. This initial shearing by the end baffle 64 allows the heaviest droplets of liquid to fall out of the composite fluid and remain in the sump portion 65 of the chamber 53.

The end baffle 64 of the spillway 61 serves to direct the composite fluid to a portion of the sump 65 of the chamber 53 furthest away from the flow path created by the plurality of baffles 30. This forces the composite fluid to travel across the sump 65 of the chamber 53 to the plurality of baffles 30. This travel of the fluid allows the larger droplets of the heavier liquid of the composite fluid to fall out of the fluid and remain in the sump 65 of the chamber 53.

Figure 2:
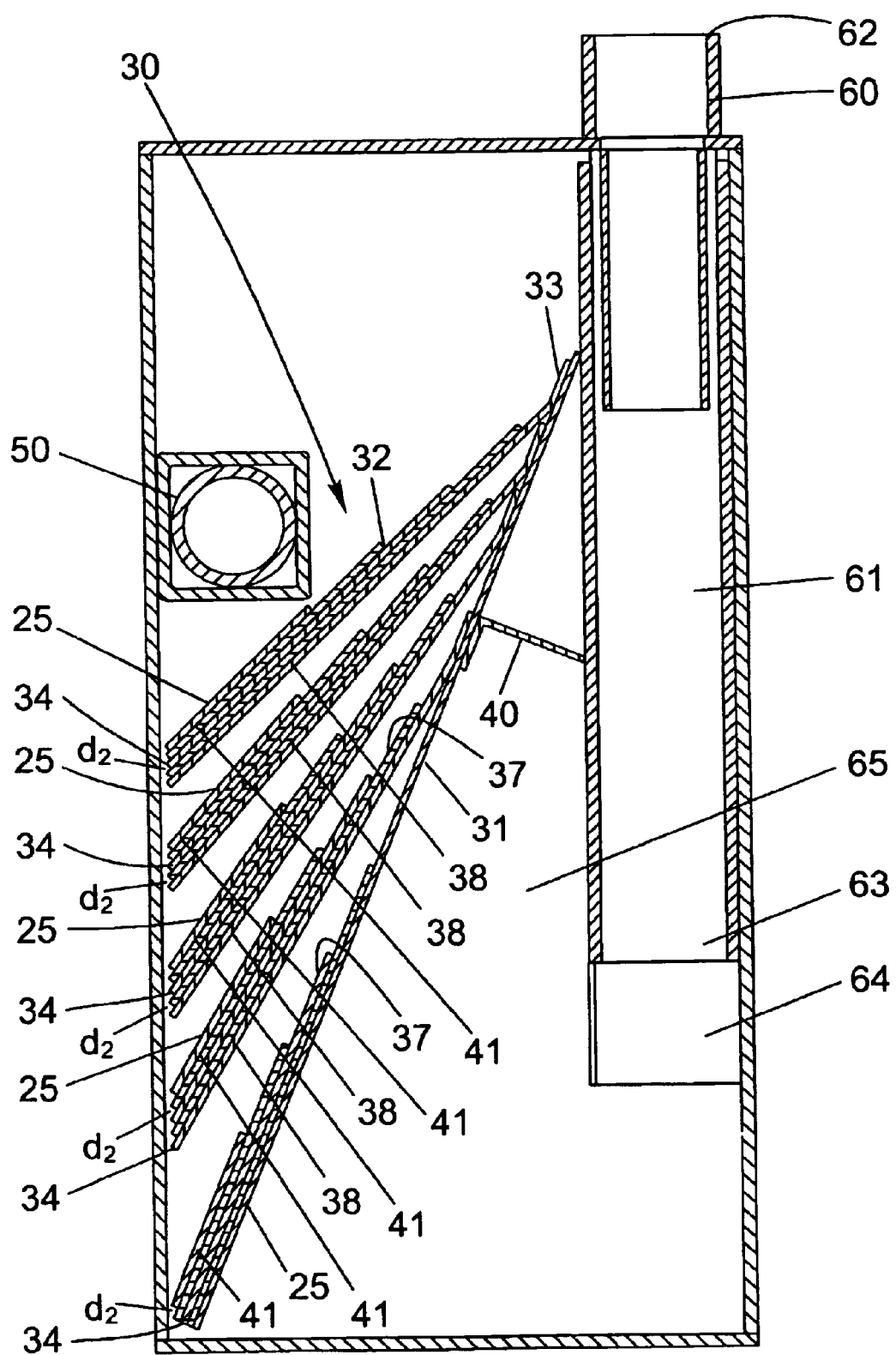
FIG. 2 is a sectional side view of an embodiment of the present invention taken along the lines 2—2 in FIG. 1, depicting the interior of the present invention in a plane.

Layered within the separation chamber 53 is a plurality of baffles or plates 30 stacked in an inclined, nonparallel relationship. As is shown in FIG. 2, this plurality of baffles 30 has a base or rear-most baffle or plate 31 which is connected to the spillway 61 at an upper end 33 thereof thereby forming the sump area 65 within the chamber 53. The upper ends of each of the remaining plurality of baffles 30 are attached to the base baffle 31 at an inclined angle. These remaining plurality of baffles 30 are positioned at an inclined relationship to the base baffle 31 at an angle increasing in relation to the vertical axis of the chamber 53.

All of the plurality of baffles 30 extend across the chamber 53 from the upper end at a downward angle directed toward the front wall 56 of the chamber 53. Each of the plurality of baffles 30 is sized so that it covers most of the entire width of the inner chamber 53 from side wall 59 to side wall 58. The lower ends 34 of the plurality of baffles 30 do not come into contact with the front wall 56 of the chamber 53, but rather end at a predetermined distance $d_1$ from the front wall 56 of the chamber 53. The predetermined distance $d_1$ may vary depending upon the circumstances and the environment in which the filter is being used and the material being separated.

Figure 3:
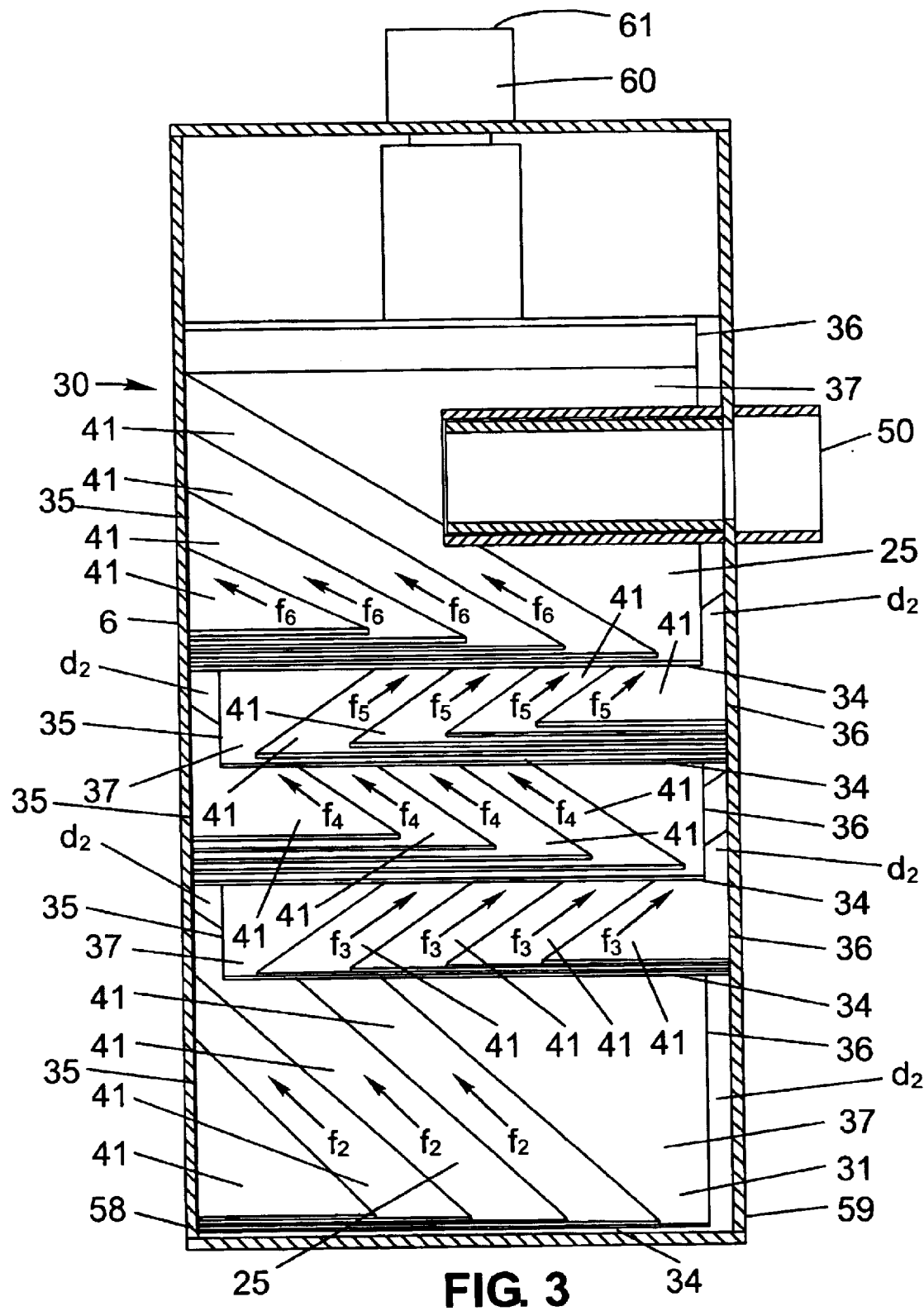
FIG. 3 is a side sectional view of an embodiment of the present invention taken along the lines 3—3 in FIG. 1, depicting the plurality of baffles stacked in an inclined relationship in a plane.
Figure 4:
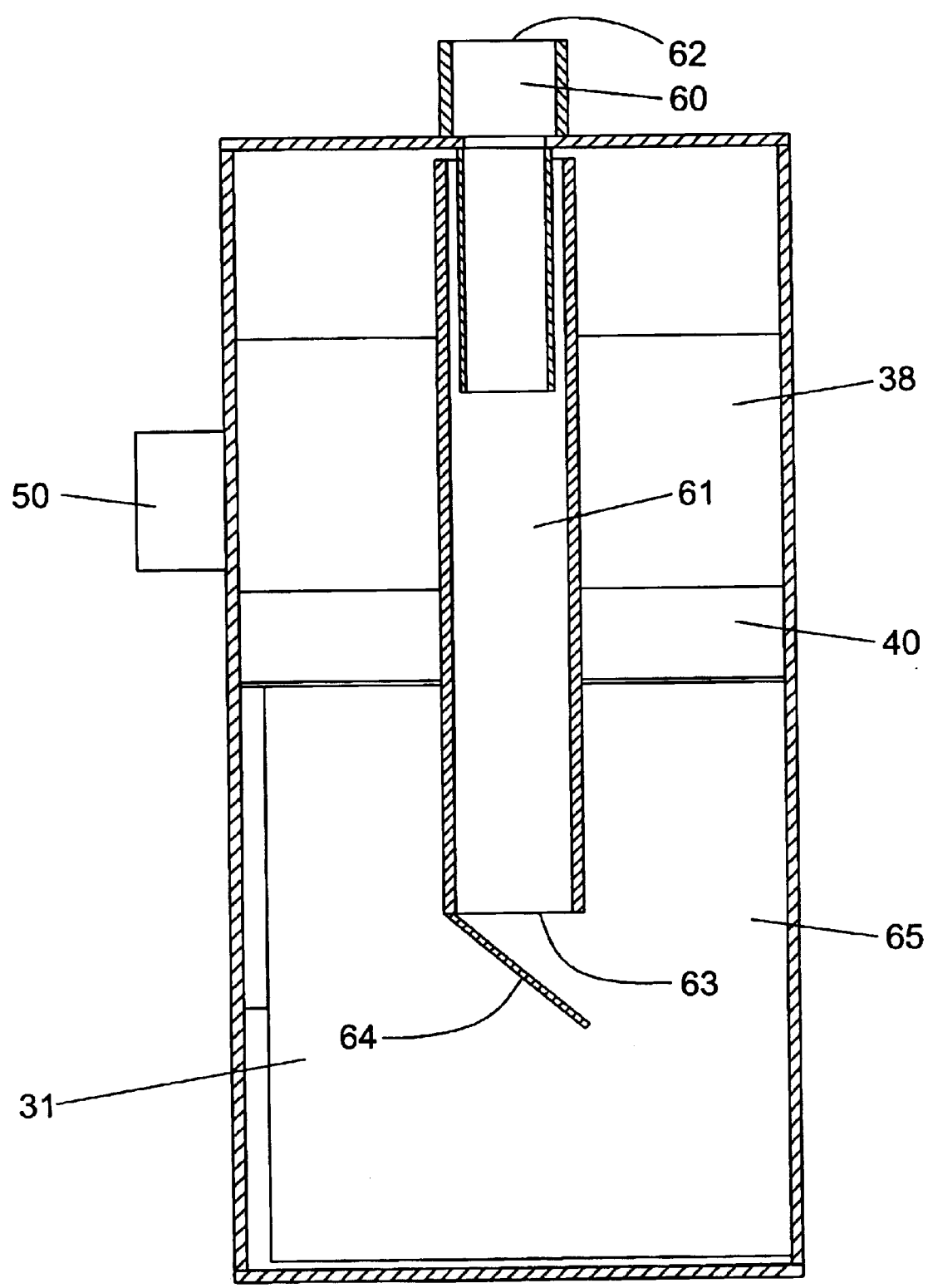
FIG. 4 is a sectional side view of an embodiment of the present invention taken along the lines 4—4 in FIG. 1, depicting the interior of the present invention in a plane.

The inclined relationship of the plurality of stacked baffles 30 creates a flow path $f_1$, as is shown in FIG. 1, between the inlet port 60 and outlet port 50. FIG. 3 depicts the placement of the plurality of the baffles 30 in relation to the side walls 58, 59 of the chamber 53. The plurality of baffles, disclosed in FIG. 1, is comprised of individual fluid separation plates or separation flow plates 25. The separation flow plates 25 provide the surface area over which the flow path $f_1$ passes. In a first plurality of baffles, a first side 35 of each separation flow plate is flush with the first side wall 58 of the chamber 53, while the opposing second side 36 of the separation flow plate or baffle 25 of said plurality of baffles 30 is placed a predetermined distance $d_2$ from the second side wall 59 of the inner chamber 53. The remaining alternating flow plates or baffles 25 in the stacked plurality of baffles 30 are placed so that the second side 36 of the baffles is flush with the second side wall 59 of the chamber 53, and the first side 35 of the baffles is placed a predetermined distance $d_2$ from the first side wall 58 of the chamber 53. The positioning of the separation flow plates in an alternating spaced relationship with the first side wall 58 and a second side wall 59 of the separation chamber 53 creates a flow path $f_1$ through which the composite fluid flows. The fluid separation plates 25 are placed in a stacked fashion in which they extend upwardly and rearwardly from a front wall 56 of the separation chamber 53 to a base baffle 31.

The number of separation flow plates comprising the plurality of baffles 30 in the displayed embodiment is five. However, depending on the efficiency of separation required, the actual number of baffles may vary. The more baffles placed within the separation chamber 53, the more efficient the separation process and longer the flow path $f_1$. In situations where the flow of the composite fluid is not a concern, the number of surface area flow plates 25 created by the plurality of baffles 30 could be substantially increased. Additionally, multiple sets of plurality of baffles 30 could be placed in succession within a larger chamber to provide even additional separation capability.

The separation flow plates 25 creating the plurality of baffles 30 by which flow path $f_1$ passes are formed by the top surfaces 37 of each of said separation flow plates 25 for each one of said plurality of baffles 30. The flow path $f_1$ for each separation flow plate 25 extends across the separation flow plate 25 in an area bounded by the flow plate 25 and the bottom surface 38 of an upper adjacent baffle of said plurality of baffles 30 and the front wall 56 of the inner chamber 53.

Each of said plurality of baffles 30 within said separation chamber are defined by the separation flow plates 25, the separation flow plates 25 being the individual baffle and hence the surface area which the composite fluid passes over. In the embodiment shown in FIG. 1, each of the flow plates 25 is comprised of a single flat top surface 37, wherein the flow path $f_1$ moves over the smooth surface thereof. As can be seen from FIGS. 2 and 3, the separation flow plates 25 may also be comprised of triangular subplates 41 which form sub-flow paths $f_2$, $f_3$, $f_4$, $f_5$ and $f_6$. As can be seen, these multiple flow paths forming composite fluid flow path $f_1$ increase the surface area upon which the material must pass and therefore properly separates the fluid appropriately.

Each of the separation flow plates 25 from the base plate 31 to the top plate 32 in the plurality of baffles 30 is placed at an angle that increases in relation to a vertical axis of the separation chamber housing 52 as the separation flow plates 25 approach an outlet chamber 50. In the disclosed embodiment, the vertical separation between each individual baffle or the separation flow plate 25 and the next upper individual baffle decreases throughout the flow path. The continuing decrease in the vertical separation between individual baffles and corresponding increase of the angle of the individual baffles affects the ability to separate composite fluids and various sized particulate by affecting the velocity that the fluid travels and the amount of turbulence that the composite fluid experiences. As the angle of the separation flow plate 25 forming the plurality of baffles 30 increases relative to the vertical axis, the speed of the fluid in flow paths $f_2$, $f_3$, $f_4$ and $f_5$ increases. The plurality of baffles 30 may be composed of steel, stainless steel, aluminum, a plastic composite or any other similar material.

A support brace 40 for the plurality of baffles 30 extends from the rear wall 57 of the chamber 53 to the bottom surface 38 of the base baffle 31. This support brace 40 is sized so that it extends in the chamber 53 from the rear wall 57 to the bottom surface of base baffle 31. Not only does the support brace 40 serve to assist in supporting the plurality of baffles 30, but it also separates the separation chamber 53 into a sump area 65 and an outlet port 50, by serving as an isolation wall to prevent the composite fluid from reaching the outlet port 50 without traveling the flow path $f_1$ created by the plurality of baffles 30. While in the preferred embodiment the support brace 40 extends from the rear wall 57, the support brace 40 can attach to either of the chamber side walls 58, 59.

Figure 5:
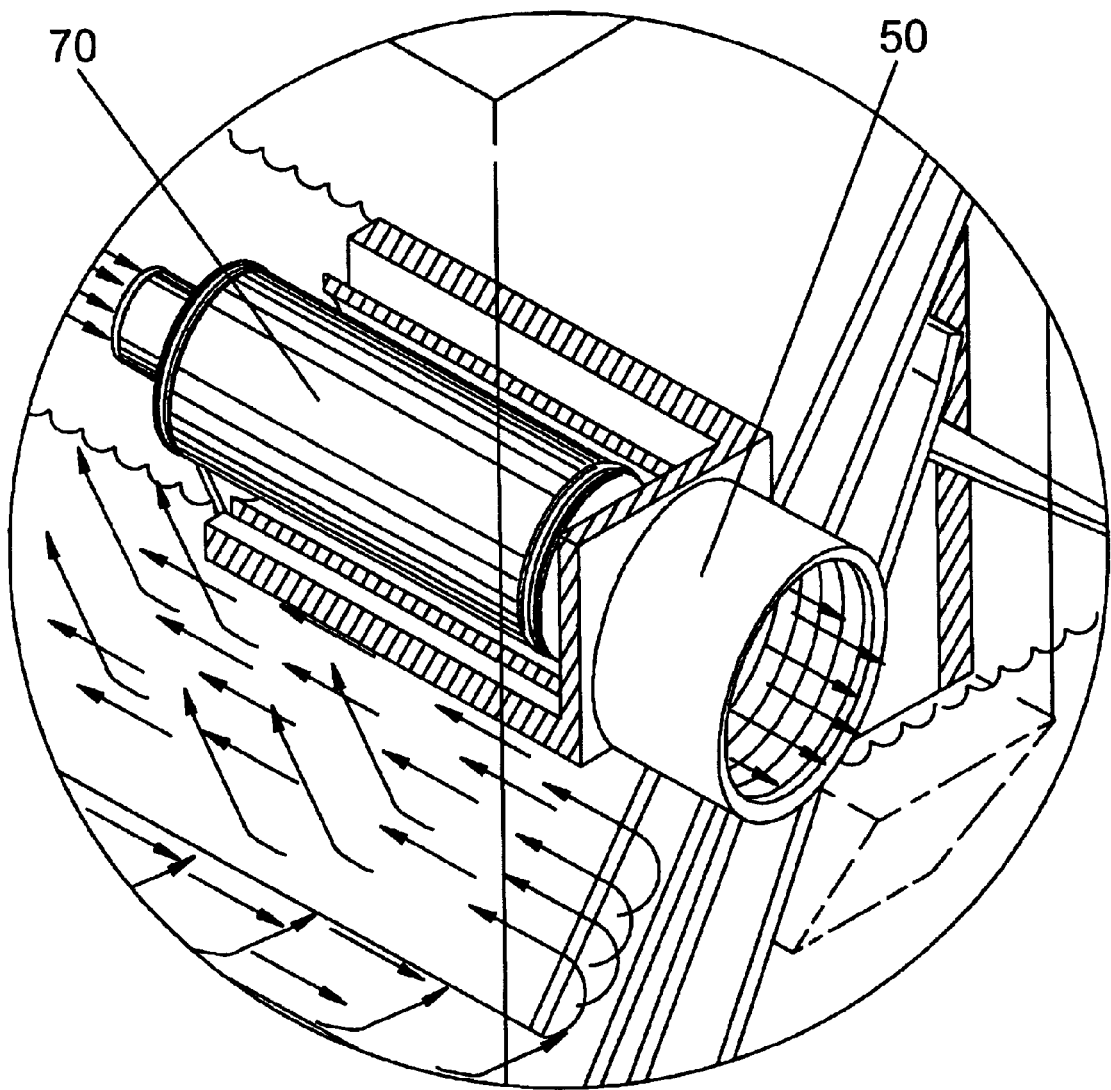
FIG. 5 is a sectional view of the output port of the present invention with a filtration device encompassed within the outlet port.

The outlet port 50 is capable of receiving supplemental filtering or coalescing devices 70 that serve to further enhance the separation capacity of the composite fluid separator, as is shown in FIG. 5. Additionally, the outlet port 50 could incorporate a magnetic fluid conditioner to separate the composite fluid.

In other embodiments of the present invention, the distances $d_2$ between the first and second sides 35, 36 of the baffles and the side walls 58, 59 of the chamber 53 and distance $d_1$ the lower end 34 of the baffles and the front wall 56 of the chamber 53 may vary depending upon the circumstances and environment in which the composite fluid separator 51 is being utilized. However, the distances $d_1$ between the lower ends 34 of the plurality of baffles 30 and the front chamber wall 56 must be less than the distance $d_2$ between the first side 35 and second side 36 of the plurality of baffles 30 and the chamber side walls 58, 59. This is necessary to ensure that the fluid moves through the flow path $f_1$, as well as $f_2$, $f_3$, $f_4$, $f_{5\ 1\ and\ f6}$, across each of the separation flow plates 25. As fluid will flow through the path of least resistance, it is important that the opening between the first side and second side 35, 36 of the separation flow plates 25 and the chamber walls 58, 59 provide this path of least resistance.

The inclined, nonparallel positioning of the separation flow plates 25 creates numerous flow paths between the plurality of baffles 30. This flow pathway is the only route through which the composite fluid may flow before accessing the outlet port 50. As the composite fluid follows this flow path created by the plurality of separation flow plates 25, it rises upward in the chamber 53 in a serpentine fashion through the plurality of flow paths mentioned. The flow paths created by the plurality of baffles 30 and hence the individual separation flow plates 25 limit the upward mobility of the fluid with the heavier specific gravity. The molecules of the fluid with the heavier specific gravity come into contact with each other and coagulate into a larger mass until eventually this mass drops into the sump portion 65 of the chamber 53. As the fluid rises in the chamber 53, it continues to lose the heavier fluid and thus the speed with which the fluid travels increases.

In an alternative embodiment of the present invention, as is shown in FIG. 2, each of the separation flow plates 25 may be comprised of a series of subplates 41. In the alternative embodiment, these subplates 41 are a variety of sizes and may be triangular in shape. The subplates 41 are stacked to form a stair-like structure and therefore form the flow paths $f_2$–$f_5$ noted.

The triangular shape of the subplates 41 serves to further direct the composite fluid at an angle up toward the next separation chamber. The series of subplates 41 also provide each of the separation flow plates 25 with an irregular surface and enlarge the contact surface area between the composite fluid and the separation flow plates 25. Increasing the contact surface area with the series of subplates 41 increases the separation of the composite fluid, and the series of subplates 41 also provide a plurality of flow paths across each of the fluid separation plates 25.

Although the preferred embodiment of this invention utilizes subplates 41 in the shape of triangles, the shape of these subplates 41 may vary to include other shapes such as square, rectangle or another shape. The separation flow plates 25 and subplates 41 may also be coated in Teflon or a similar type of material to assist with the separation of particulate from a fluid.

The foregoing detailed description is given primarily for clearness of understanding, and no unnecessary limitations are to be understood therefrom, for modifications will become obvious to those skilled in the art upon reading this disclosure and may be made without departing from the spirit of the invention and scope of the appended claims.

I claim:

1. A composite fluid separator, comprising:

a chamber, said chamber having an inlet port and an outlet port, a plurality of stacked baffles at an inclined relationship extending between said inlet port and said outlet port, and wherein said baffles have an increasing angle of inclination relative to a vertical axis as the baffles approach said outlet port.

2. A composite fluid separator, comprising:

a chamber, said chamber having an inlet port and an outlet port, a plurality of stacked baffles at an inclined relationship extending between said inlet port and said outlet port, wherein said plurality of stacked baffles each forms a fluid separation plate across which said composite fluid flows, and said fluid separation plates are comprised of a plurality of triangular shaped baffles.

3. A composite fluid separator, comprising:

a chamber with a top and bottom surface, a wall surrounding the periphery of said chamber;

an inlet port in said top surface of said chamber, an outlet port on said wall of said housing; and a plurality of separation flow plates at an inclined relationship extending between said inlet port and said outlet port; wherein alternating separation flow plates of said plurality of separation flow plates have a first side and a second side, wherein said first side is positioned flush with a first chamber side wall and said second side is positioned by a predetermined distance from a second chamber side wall, and wherein the remaining separation flow plates of said plurality of separation flow plates have a first side and a second side, wherein said second side is positioned flush with said second chamber side wall and said first side is positioned said predetermined distance from said first chamber side wall, wherein said separation flow plates have an upper and a lower end, said lower end positioned a second predetermined distance from a chamber front wall.

4. The composite fluid separator of claim 3 wherein said plurality of separation flow plates has a top surface, said top surface having a plurality of layered subplates, and wherein said plurality of layered subplates are triangular in shape.

5. A composite fluid separator, comprising:
a separation chamber, said separation chamber having an inlet port and an outlet port;
a plurality of baffles positioned between said inlet and outlet port, wherein each of said plurality of baffles has an upper and lower end, said plurality of baffles including a base baffle, said upper ends of each of said plurality of baffles attached to said base baffle in an inclined relationship;
each of said plurality of baffles having an increasing angle of inclination with a vertical axis through said separation chamber as said baffles approach said outlet chamber.

6. The composite fluid separator of claim 5 wherein each of said lower ends of said plurality of said baffles is positioned a predetermined distance from a chamber front wall.

7. The fluid separator of claim 6 wherein said plurality of baffles is positioned so that each alternating baffle has a first side and a second side, said first side being flush with a first chamber side wall and said second side of said alternating baffles being positioned from a second chamber side wall a predetermined distance, the remaining of said plurality of baffles have said second side flush with said second chamber side wall and said first side of said plurality of baffles positioned said predetermined distance from said chamber first chamber side wall.

8. A composite fluid separator, comprising:
a separation chamber having an inlet port and an outlet port;
a plurality of fluid separation plates, said fluid separation plates positioned between said inlet port and said outlet port;
wherein said plurality of fluid separation plates are positioned in alternating spaced relationship with the first side wall and a second side wall of said separation chamber;
a base plate, said base plate separating said separation chamber into a sump area and an outlet area;
wherein each of said plurality of fluid separation plates is downwardly angled from said base plate; and
wherein each of said plurality of fluid separation plates is separated from a front wall of said separation chamber by a predetermined distance.

9. The composite fluid separator of claim 8 wherein said each of said fluid separation plates is composed of a plurality of subplates, and wherein said subplates are triangular in shape.

10. The composite fluid separator of claim 9 wherein said subplates form a plurality of flow paths across each of said fluid separation plates.

11. The composite fluid separator of claim 10 wherein said plurality of flow paths is upward towards said outlet port.

12. The composite fluid separator of claim 11 wherein said plurality of fluid separation plates are placed in stacked relationship extending upwardly and rearwardly from a front wall of said separation chamber to a base plate, said base plate separating said separation chamber into a sump area and said outlet port.

13. A composite fluid separator, comprising:
a separation chamber having a base plate located therein, said base plate separating said chamber into a sump area and an outlet port;
a plurality of fluid separation plates, said fluid separation plates placed in alternating stacked spaced relationship from a first side wall of said chamber and a second side wall of said chamber, said spaced relationship from said first side wall and said second side wall a first predetermined distance, each of said plates separated from a front wall of said separation chamber by a second predetermined distance.

14. The composite fluid separator of claim 13 wherein said plurality of fluid separation plates are stacked from a base fluid separation plate to a top fluid separation plate in increasing inclination relative to a vertical axis through said separation chamber.

15. The composite fluid separator of claim 13 wherein said separation plates are comprised of a plurality of subplates.

16. The composite fluid separator of claim 15 wherein said subplates are triangular.

17. The composite fluid separator of claim 16 wherein said triangular subplates form a plurality of flow channels across each of said plates.

18. The composite fluid separator of claim 16 wherein said subplates range in size from a larger subplate at a bottom surface of said fluid separation plate to increasing smaller fluid separation plates.

* * * * *